United States Patent
Candeo (10) Patent No.: US 7,152,465 B2
(45) Date of Patent: Dec. 26, 2006

(54) DYNAMOMETRIC BENCH FOR HEADSTOCKS WITH SOHC AND DOHC TYPE OVERHEAD CAMSHAFT FOR INTERNAL COMBUSTION ENGINES

(76) Inventor: Zauri Candeo, Rua Curuçá, Apto 12-Vila Maria, São Paulo (BR)

( * ) Notice: Subject to any disclaimer, the term of this patent is extended or adjusted under 35 U.S.C. 154(b) by 0 days.

(21) Appl. No.: 11/182,660

(22) Filed: Jul. 15, 2005

(65) Prior Publication Data

US 2006/0010970 A1    Jan. 19, 2006

(30) Foreign Application Priority Data

Jul. 16, 2004    (BR) .................................... 0402964

(51) Int. Cl.
*G01M 15/00* (2006.01)
(52) U.S. Cl. .................................... 73/119 R
(58) Field of Classification Search .................. 73/116, 73/117.2, 117.3, 118.1, 119 R
See application file for complete search history.

(56) References Cited

U.S. PATENT DOCUMENTS

| | | | | |
|---|---|---|---|---|
| 3,973,429 A | * | 8/1976 | Durgan et al. ................ | 73/49.7 |
| 4,213,328 A | * | 7/1980 | Roeschlaub et al. ......... | 73/49.7 |
| 5,499,530 A | * | 3/1996 | Vondell et al. ............... | 73/49.7 |
| 5,515,712 A | * | 5/1996 | Yunick ............................. | 73/9 |
| 5,705,742 A | * | 1/1998 | Fox et al. ...................... | 73/116 |
| 6,035,707 A | * | 3/2000 | Main ............................ | 73/116 |
| 2006/0048565 A1 | * | 3/2006 | Rutschmann et al. ..... | 73/119 R |

* cited by examiner

*Primary Examiner*—Eric S. McCall
(74) *Attorney, Agent, or Firm*—The Webb Law Firm (57) ABSTRACT

Dynamometric bench for headstocks with SOHC and DOHC type overhead camshaft for internal combustion engines has a testing workbench connected to a monitoring and control panel such that the testing workbench comprised of a mobile platform, protected by a cover, where the headstock is placed, with an overhead camshaft gear directed towards the front of the equipment, thus allowing a grooved belt to pass through the testing workbench and is coupled to a synchronizer, at the same time is coupled to an electrical motor by other belts, such that in the interior and opposite part of the testing workbench an oil reservoir is available, coupled to a pump, that pressurizes the oil inside the headstock, when the system is turned on; at the other end of the electrical motor a charging cell is coupled, which at the same time is connected to an energized conductor, which sends measurement signals to the monitoring and control panel, composed of a digital counter in front and a digital acceleration control, that show the acceleration, a digital display, which present the friction force reading and the haul force reading and a digital manometer, that indicates the oil pressure.

2 Claims, 8 Drawing Sheets

DYNAMOMETRIC BENCH FOR HEADSTOCKS WITH SOHC AND DOHC TYPE OVERHEAD CAMSHAFT FOR INTERNAL COMBUSTION ENGINES

BACKGROUND OF THE INVENTION

1. Field of the Invention

The present invention refers to a testing bench equipped with dynamometric reading capable of measuring the frictional force caused by the warping of the overhead camshaft or misalignment of the headstock bearings, or the lack of frictional force due to low loading of the valve springs. These parameters are easy to diagnose, wherein they show whether there is an excessive clearance of the overhead camshaft support brackets and headstock springs. Moreover, these findings are confirmed through the excessive amount of oil lubricant sprinkling when placed in stepped acceleration rates, which is a phase determined by a table, also created with parameters specifically for this invention.

Such invention facilitates the direct diagnosis of eight possible defects, demonstrated in each phase of the patent. These defects could be detected only after completing the entire headstock mounting in the motor and its installation in the vehicle, or during the course of the warranty period when the defect may have worsened.

This equipment, therefore, which is in the patent application in question, has been especially designed and developed to obtain enormous practicality and to offer great advantages in its use as well as in its manufacture in series.

2. Description of Related Art

It is a well-known fact, for example, that the majority of the modern high-speed rotation internal combustion engines are endowed with grooved belts in its distribution system (crankshaft and overhead camshaft). This grooved belt will have to be substituted normally within a usage range between 30,000 Km (18,634 Mi) and 60,000 Km (37,267 Mi) and, in some models within a maximum of up to 90,000 Km (55,901 Mi), depending on the concept adopted by each engine manufacturer.

Automobile users (a good majority of them) prefer to run the risk because when a grooved belt normally breaks, it damages the inlet and exhaust valves, requiring the necessary removal of the headstock so as to correct it, or the substitution of the parts that were damaged. The necessity to overhaul the headstock can also occur: (1) when the engine is "worn out"; or (2) when there is an excessive thudding of the valve; or (3) through faulty hydraulic tappet; or even yet, (4) through premature abrasion of the cam of the overhead camshaft; (5) when there is already an excessive oil burning caused by the gasket rings of the valve stems and also, by the loss of power; (6) through the wear and tear of the seats, valves and guides; (7) through the removal of the headstock and the shop's necessity to do so; (8) through damages caused by overheating; (9) through the removal of the headstock to allow decarbonization; and so forth.

For all these reasons previously described, the most critical part among the great majority of engines, within the concept of engines, is the upper part, inasmuch as the most durable is the lower part, that is, the block, the crankshaft, the piston, and so forth.

In correcting, doing a check-up or carrying out the substitution for a new headstock with overhead camshaft in the head and for all assembly parts, such as the camshaft, rocker arms, hammers, hydraulic or mechanical tappets, inlet and exhaust valves, gasket rings, springs and keys, all of these require adjustment, calibration and regulation services and care, according to the manual of each engine type and manufacturer.

Such degree of applied technical responsibility would need a machine capable of testing the quality and efficiency of the mounted headstock and its parts. However, another alternative of testing the mounted headstock and its parts does not exist, unless it is installed in a complete engine block and is placed in operation within the vehicle or in a dynamometer. In case malfunction occurs in one of the dozens of parts assembled with the headstock, the solution, most of the time, would be for the mechanic to remove it to perform the same service all over again.

It does not always happen that after the second check-up, the defect or noise is discovered, which causes delay in the delivery of the vehicle to the client. This situation even becomes worse when the engine is imported, since the parts are very expensive and are not always available in the spare parts market, which causes the loss of applied materials, such as: headstock bracket, inlet and exhaust collector, cooling system additive, among others. When dealing with imported parts, the cost of re-work is high, not to speak of the waste of labor applied in the corrections.

We must also remember labor accidents due to burns caused by the dissipation of smoke and evaporation of hot oil lubricants, which exposes the mechanic to unhealthy conditions and, most of all, the loss of time since, in case the task presents any discrepancy, it will be necessary to wait for the temperature to lower, at times this takes hours, so as to carry out a new correction.

SUMMARY OF THE INVENTION

The present invention has the privilege of testing and simulating the operation of the headstock, as if it were installed in the upper part of the engine block, and the advantage of such a simulation being done in cold, as it may be added, is the fact that the headstock, tested outside the engine block through the dynamometric bench, facilitates the diagnosis, since it has been tested.

In case the headstock that has already been tested is installed in the engine block and presents some strange thudding or noise, it is immediately established that the defect is found in the lower part, that is, the block. On the contrary, if the headstock has not been tested and approved and assembled to the engine block in operation, certainly, it would be difficult to conclude that the work remained in perfect conditions, since the increasing noise of the natural engine sound would blend with other possible noises, thus it would be difficult to identify anomalies, compromising the evaluation or diagnosis.

Therefore, the use of this invention in question is indispensable, such that it guarantees precision, speed and safety to the diagnosis and time saving to the mechanic and to the specialized shop, the rebuilding/overhaul service provider.

This way, the intervention will be focused only in the lower part of the engine block, since the upper part was already subjected to the tests.

Therefore, the present patent was projected aiming to obtain an equipment with the least number of parts possible, conveniently configured and prepared to perform their functions with unique efficiency and versatility.

In this present patent application, a practical and innovative headstock testing bench is presented with all the esthetic and functional qualities, designed and developed according to the latest techniques, this way allowing its most varied use for diverse types of headstock models with overhead camshaft in the head.

The configuration of the equipment, object of this present patent, in its new constructive form, is comprised of a testing workbench connected to a monitoring and control panel by means of a conductor.

The testing workbench, at the same time, is composed of a structure highly equipped with a mobile platform whose horizontal movement is operated by means of a hydraulic system operated through a lever whose locking is done through a gauntlet, wherein the headstock under test is protected by a transparent acrylic cover and, over the mobile platform, the headstock will be installed with an overhead camshaft gear directed towards the front of the equipment, thus allowing a grooved belt to pass through the testing workbench which is coupled to a synchronizer, which at the same time is coupled to an electrical motor by means of other belts.

In the interior and lower part of the testing workbench, an oil reservoir is available, coupled to a calibrated oil pump that pushes oil into the headstock, when the system is turned on.

Now, at the other end of the electrical motor, a charging cell is coupled, which at the same time is connected to an energized conductor, that sends the measurement signals to the monitoring and control panel, composed of a module containing in the front a digital counter, that shows the digital or programmed acceleration, and digital displays that show the frictional force reading and the hauling force reading, respectively.

It is thus to be understood that the device in question is extremely simple in its constructibility and, therefore, of easy workability; however, excellent practical and functional results are obtained, offering an innovative constructibility.

Constructed with innovative design, it results in a harmonic ensemble, of rather peculiar aspect and, above all, distinctive, in that, aside from the constructive aspect, the model is outstanding for its versatility and convenience of use.

BRIEF DESCRIPTION OF THE DRAWINGS

For better understanding and comprehension of the present invention, the annexed design illustrations are presented and as follows, as one can see.

DETAILED DESCRIPTION OF THE INVENTION

According to the above figures, object of the present patent, is essentially characterized by being composed of a testing workbench (1) connected to a monitoring and control panel (2) by means of a conductor (3). The testing workbench (1), at the same time, is composed of a structure highly equipped with a mobile platform (4) whose horizontal movement is operated by menas of a lever (5) and whose periphery is protected by a transparent acrylic cover (6).

The headstock (7) is installed over the mobile platform (4), with an overhead camshaft gear directed towards the front of the equipment, thus allowing a grooved belt (8) to pass through the testing workbench (1) and is coupled to a synchronizer (9), and an intermediary axle (14) at the same time is coupled to an electrical motor (10) by means of other belts (11).

In the interior and opposite part of the testing workbench (1) an oil reservoir (12) is available, coupled to a calibrated oil pump (13) which pushes oil into the headstock (7) when the system is turned on.

At the other end of the external framework of the electrical motor (10), a charging cell (15) is coupled, which at the same time is connected to an energized conductor (3) that sends the measurement signals to the monitoring and control panel (2), comprising a digital rotation counter (17) and a digital rotation control (18), that shows the digital acceleration, a digital display (20), that present the anti-torque force reading and the hauling force reading and a digital manometer (19) that indicates the oil pressure.

Figure 3:
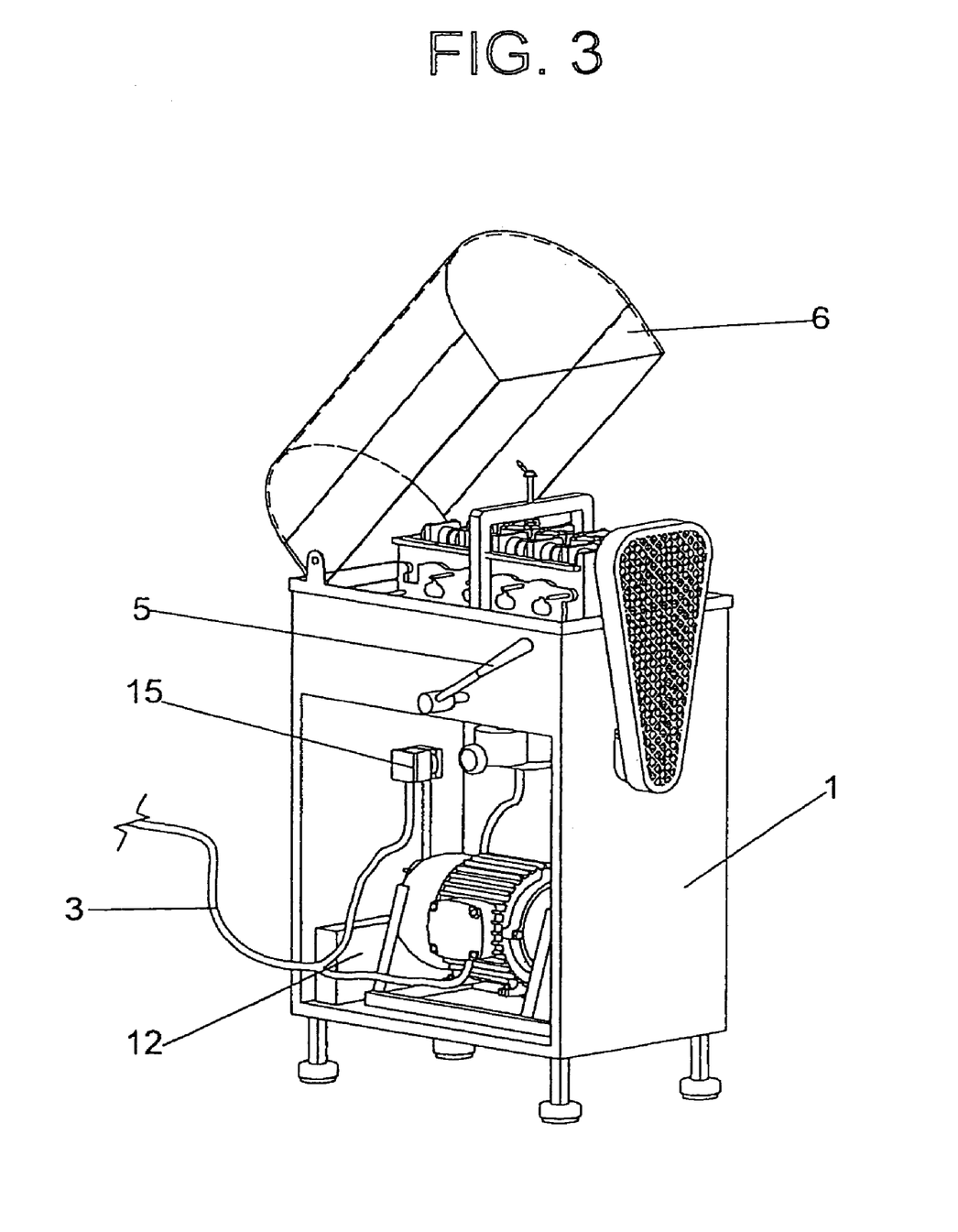
FIG. 3—Shows a front view of the testing workbench, an integral part of the dynamometric bench, with an open acrylic protection cover.
Figure 4:
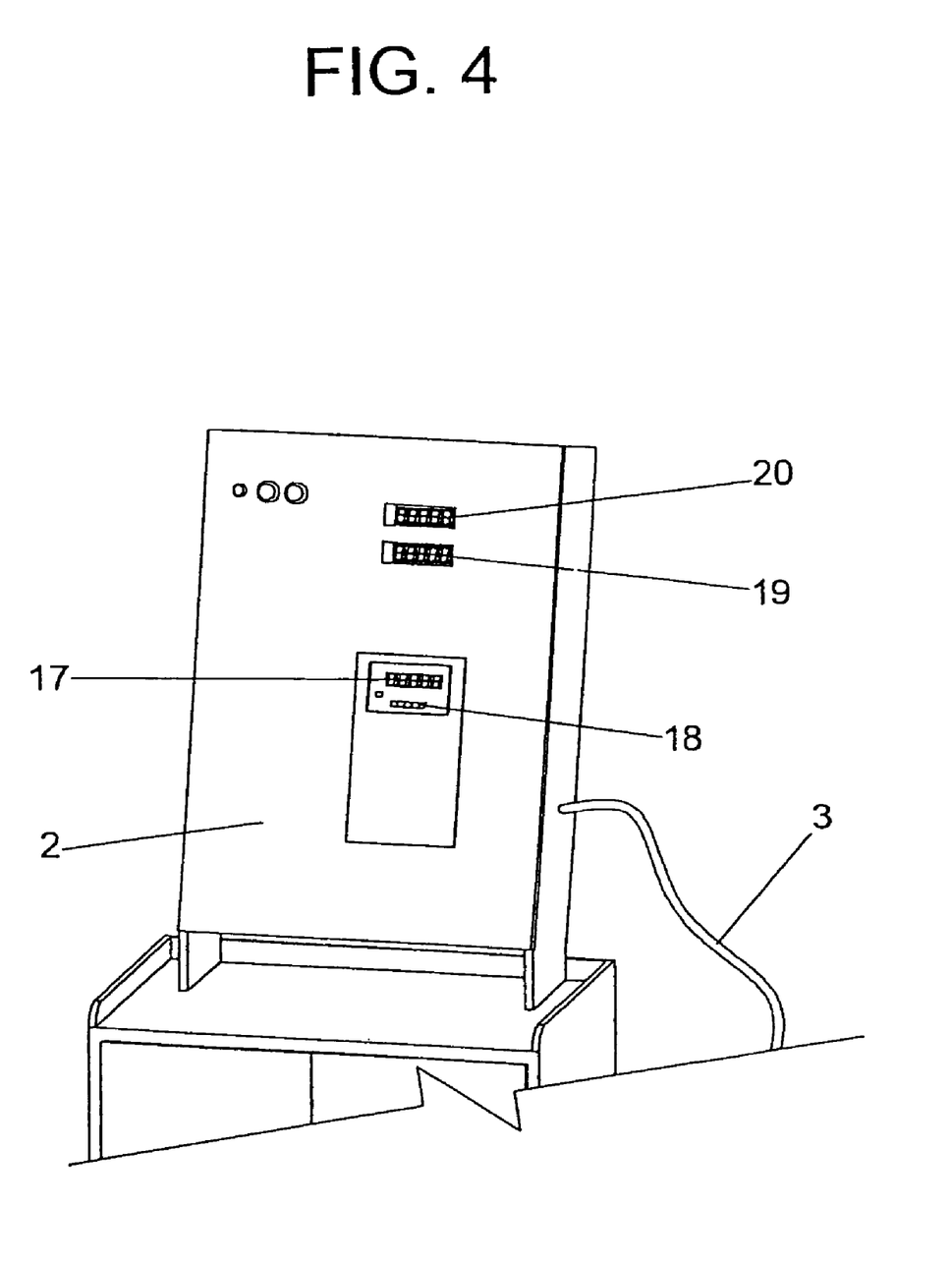
FIG. 4—Shows a front view of the monitoring and control panel, an integral part of the dynamometric bench.

Eight types of tests can be observed when a headstock (7), that contains an overhead camshaft (21) of the "SOHC" (single overhead camshaft) type or of the "DOHC" (dual overhead camshaft) type is subjected to the dynamometric bench, which are synthesized as follows:

$1^{st}$ Test: Overhead camshaft (21) and grooved belt (8): the hauling traction of the overhead camshaft (21) of the "SOHC" or "DOHC" type system is tested, as well as the traction force of the grooved belt (8) except the friction that results in the specification of an appropriate table for variable rotations (FIG. 4), with digital acceleration control (18) and digital rotation counter (17), which the electrical motor (10) of the dynamometric bench varies between 0 and 3500 rpm, determining the hauling force reading on the digital display (20) in Kgf. Depending on the desired programming in the converter, synchronism occurs between the belts (8) and (11) causing an anti-torque, which is measured by a charging cell (15) through the energized conductor (3) (FIG. 3), which carries the frictional and anti-torque force values, converting them in Kgf in the digital display (20) (FIG. 4).

Figure 5:
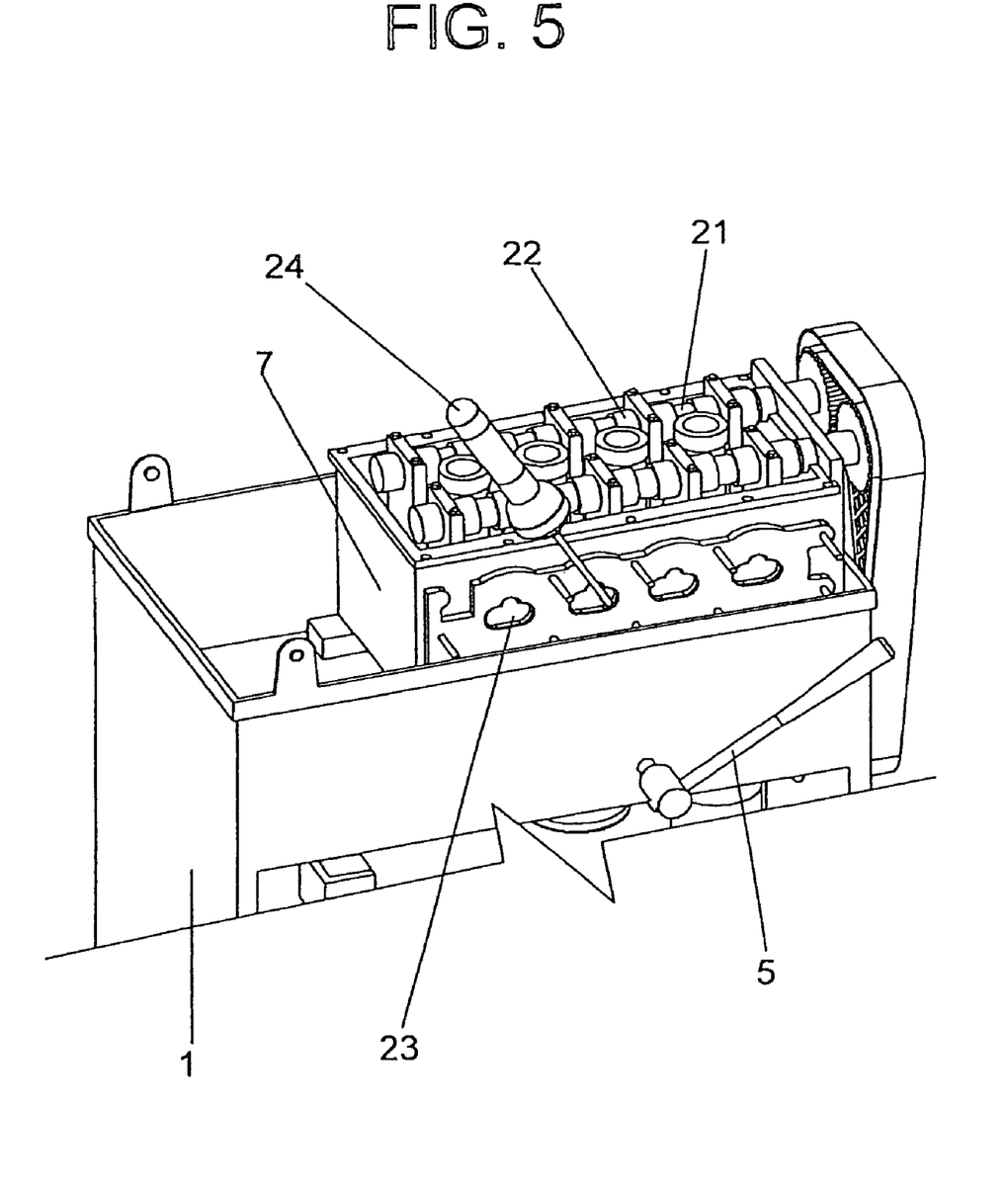
FIG. 5—Shows a an illustrative view of a headstock, during an internal inspection with an optic fiber conducted lamp, an integral accessory of the dynamometric bench.
Figure 6:
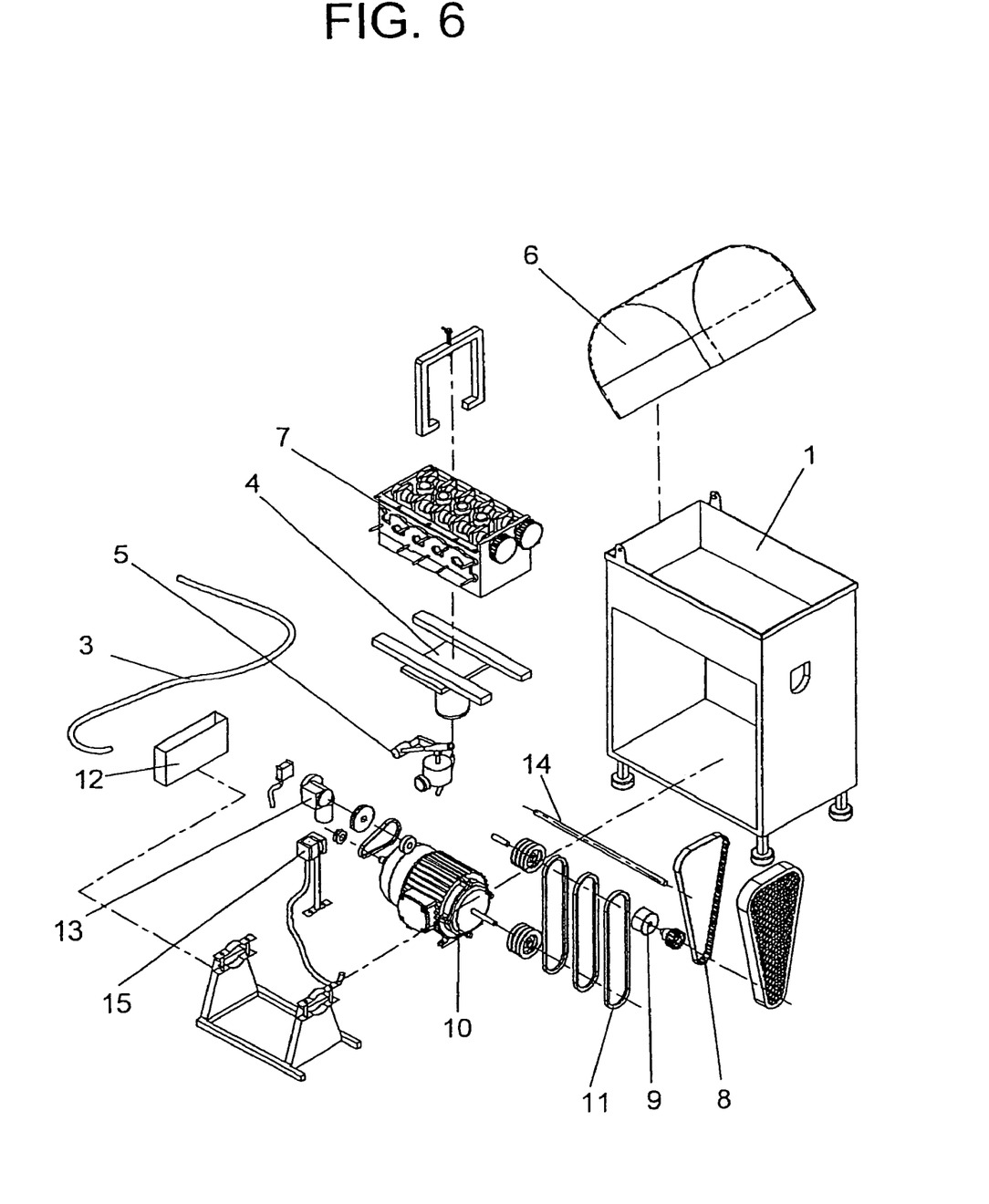
FIG. 6—Shows an exploded view and front view of the testing workbench, an integral part of the dynamometric bench, that better illustrates its various parts.
Figure 8:
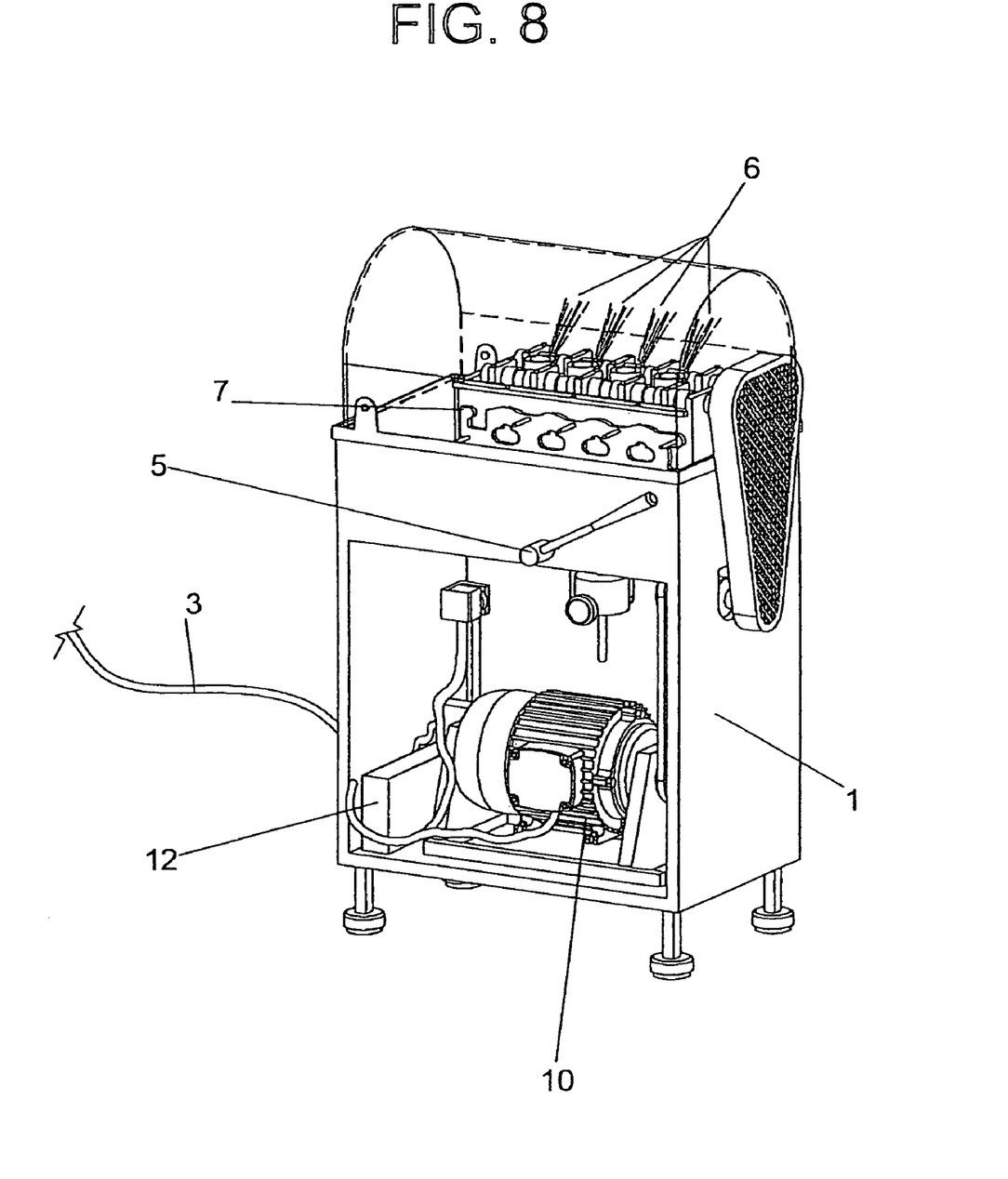
FIG. 8—Shows a front view of the testing workbench, an integral part of the dynamometric bench, with a closed acrylic protection cover and in full use, sprinkling oil lubricant.

$2^{nd}$ Test: Hydraulic tappets: the operation and loading of hydraulic tappets is tested, through the pressurization of oil stored in the reservoir (12) through the calibrated oil pump (13), rotated together by the second extremity of the electrical motor axle (10) (FIG. 8). The oil pump pressure (13), which is indicated in the digital manometer (19), is proportional to the rotation of the electrical motor (10), which, through the digital acceleration control (18), determines the rotation between 0 and 3500 rpm, through the cams (22) of the overhead camshaft (21) (FIG. 5). The cam (22) operates the hydraulic tappet, loading it with oil lubricant stored in the reservoir (12), in order to test the correct operation of this overhead camshaft/tappets, which is geared through the grooved belt (8). After the hydraulic loading of the tappets, they stop thudding and, if in one case or another, it continues to thud and is not loaded, the substitution is provided or the reconditioning of these is redone, after a previous and easy visualization.

3$^{rd}$ Test: Warping, lack of clearance or misalignment of the headstock and overhead camshaft: to test such factor through the increase of frictional or hauling force of the grooved belt (8) traction, indicated in the digital counter (20). In order to do this test, an appropriate and empirical table was created, to attribute minimum permissible values for the frictional and anti-torque force reading presented on the digital display (20). The said table specifies for each type and model Otto and Diesel cycle headstock, according to the engine brand and type, national or imported, fastening the headstock to the testing bench (1). In case a determined reading does not match, it is necessary to remove the overhead camshaft (21) and analyze its alignment. In case the overhead camshaft (21) has been proven aligned, the alignment of the bearings is examined, since such factor is due to a previously suffered overheating, or lack of lubrication or when the screws that fastened the headstock (7) to the engine block were randomly loose, and the correct procedure for their loosening was not observed, leaving the headstock (7) (FIG. 5) with the lever function, causing its torsion or warping.

4$^{th}$ Test: Excessive lubricant escape due to waste or excess of clearance of the bearings or overhead camshaft support brackets: when this factor happens in the lubrication system pressurized by the calibrated oil pump (13) (FIG. 8), the oil pressure indicated in the digital manometer (19) drops and increases considerably the oil lubricant thrust in the acrylic protection careen (6) (FIG. 8) of the dynamometric bench. To facilitate identification of this defect, a field exists in the appropriate table for each headstock (7) type and model, always in relation to the rotation of the overhead camshaft (21).

5$^{th}$ Test: clearance of the valves: allows to check quickly the complete headstock (7), as well as to correct possible mounting errors or malfunction of pads and hammers. It also functions as a pre-softening bench, since it facilitates the hearing of the presence of strange thuddings, susceptible to be corrected immediately. After completing all the trials of the assembly in the cited phases, the headstock (7) will be ready for regulation or simple checking of the clearances of the valves, in accordance with the manufacturer's manual or inserted clearances in the appropriate table.

6$^{th}$ Test: Gasket rings for valve stems: in order for the entire headstock to function equally when installed in the engine block. The oil lubricant used for the operation is preferably of the "SAE 10" type without detergent, which corresponds approximately to the heated "SAE 30" oil type. Due to low viscosity, the "SAE 10" oil facilitates penetration in the lower part of the valves. In case the gasket rings were faulty or incorrectly installed, the operator can easily see the stickiness through the inlet or exhaust duct (23) cavities (FIG. 5). Such procedure can be done with the naked eye, or through the use of a magnifying lens or boroscope. For this case, a lamp (24) with optic fiber conducted lighting accompanies the machine, thus avoiding that a gasket ring remains faulty or, through the lack of adequate device and tools at the time of mounting. The non-observation will cause the excessive burning of oil lubricant due to its deficiency, be it due to quality or incorrect mounting.

7$^{th}$ Test: Gasket or settlement of valves: after doing the pre-softening at high-speed rotation, the rotation is reduced to 50 rpm and in the testing bench itself; it is applied to a tool known as vacuometer. In opening and closing the valve at low-speed rotation (50 rpm), the vacuometer indicates the perfect settlement of the seat and valve gasket, repeating such operation to all the inlet and exhaust valves, approving and assuring the final quality, aside from making the headstock (7) reach the recommended compression pressure, assuring the real power of the engine and the perfect burning of the mixture, bringing back the engine to the pollutant levels in accordance with phases I, II and III of CONAMA (National Environmental Council) and the other future phases, thus contributing in a significant way to the environment.

Figure 1:
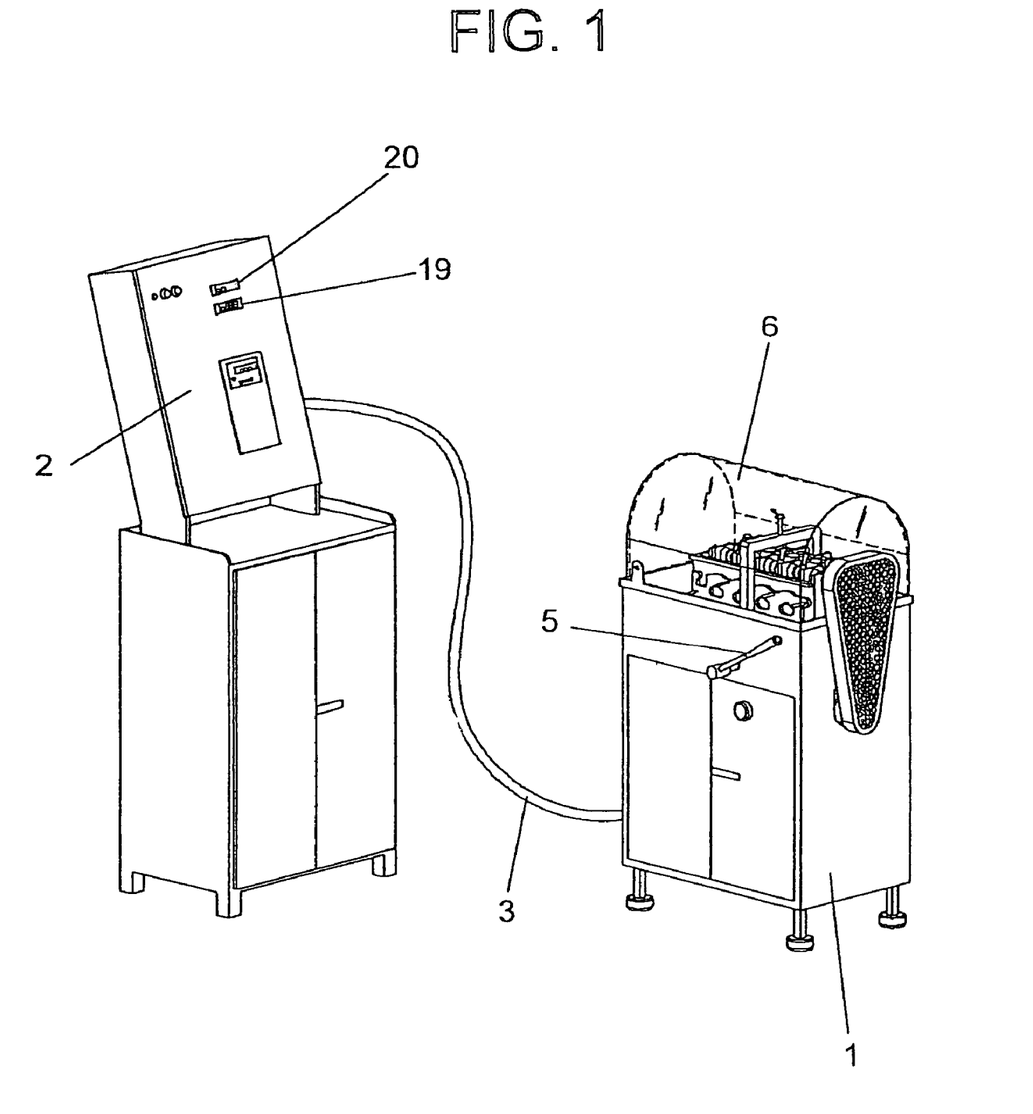
FIG. 1—Shows a front view of the dynamometric bench, object of the present patent.
Figure 2:
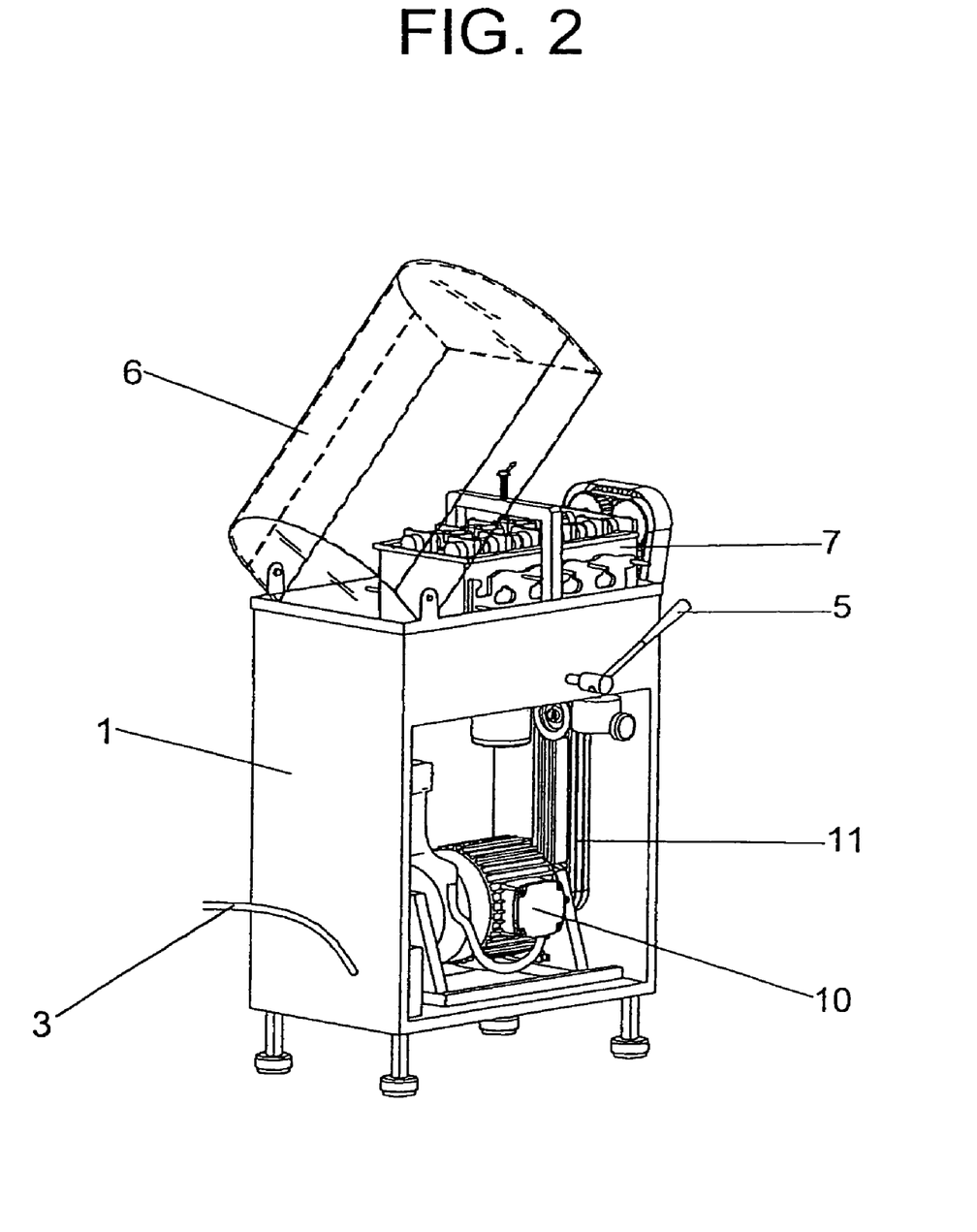
FIG. 2—Shows a rear view of the testing workbench, an integral part of the dynamometric bench, with an open acrylic protection cover.
Figure 7:
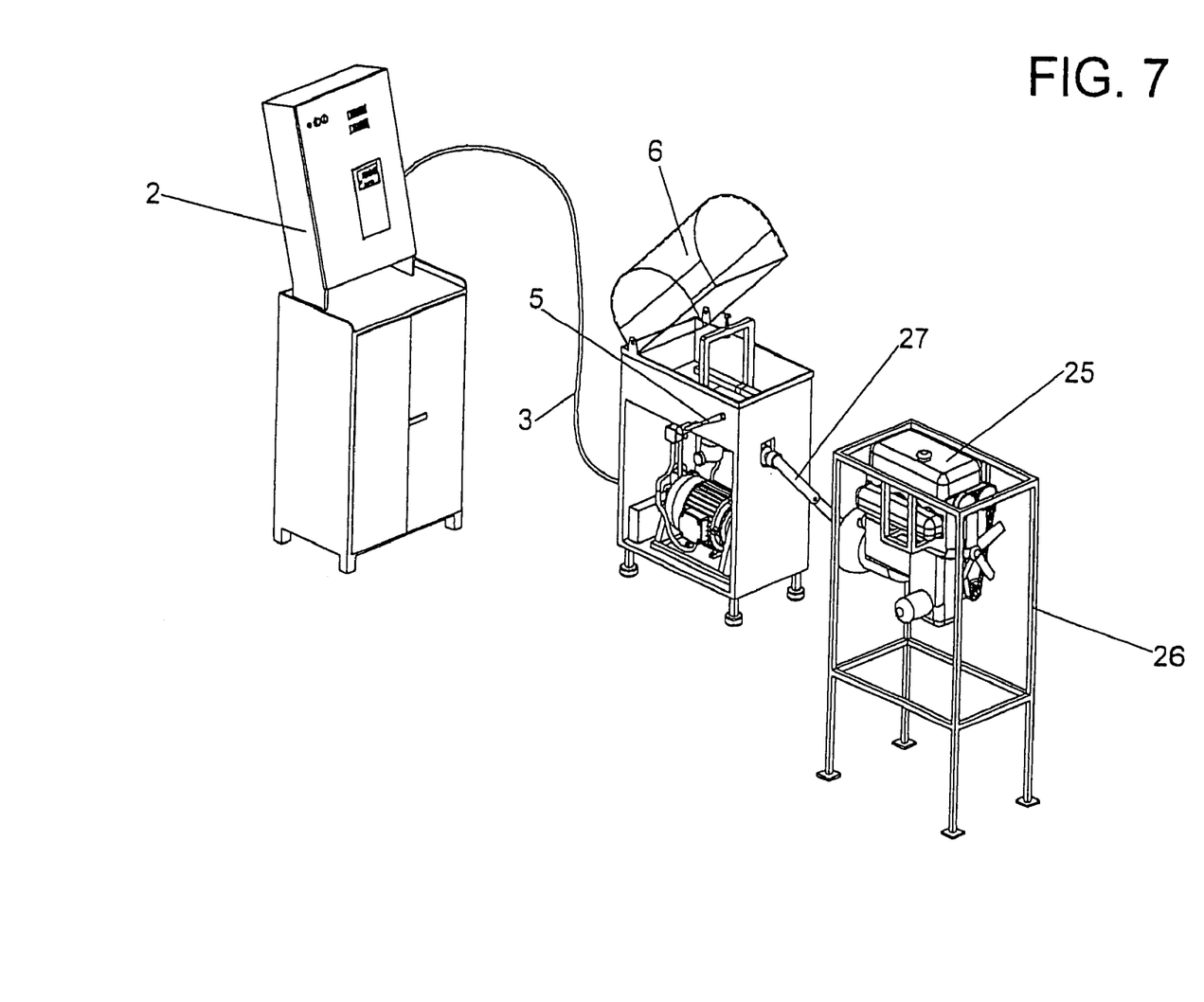
FIG. 7—Shows a front view of the dynamometric bench, object of the present patent, optionally used for the complete engine test.

8th Test: Other possible tests to be realized: aside from the functions described above, this machine is also efficient for testing the closed assembly of engines when overhauled. The wheel or crankshaft pulley of the engine (25), which is found fixed in a mobile device (26) (FIG. 7), is coupled through a cardan-shaft (27) (FIG. 7) to the synchronizer axle (9). These engines can be of any type of overhead camshaft "OHV-SOHC-DOHC" and of the Otto cycle and Diesel cycle engines, measuring the hauling friction of the engines through the digital display (20) (FIG. 7), simulating the operation of the engine without load, that is, in free gear from 0 to 3500 rpm (FIG. 1), facilitating the hearing of possible abnormal noises, as well as the execution of oil pressure measurement of the closed "engine" assembly, being able to apply a portable manometer in the oil pressure line and checking the adequate pressure, compression pressure of the cylinders, possible escape due to captive valve or due to lack of gasket in the sequence rings, cylinder ovalization and conicity, and visualization of possible oil lubricant leaks. The cold engine pre-softening avoids internal carbonization of the engine and the exposure of the technical operator to unhealthiness, thus being able to use in its operation oil lubricant specific for stocking that guarantees long duration in the storage, avoiding internal oxidation of the parts. After the test, the used oil must be drained and filtered, and may be reused in the following tests of the other units, providing a test option in free gear, since the engines equipped with electronic injection present complex and specific electronic units for each type of vehicle, making difficult the tests of these engines in a dynamometer.

Thus, it can be established through all the above that the subject invention is characterized as an instrument of great use, presenting all practical qualities and functionalities which fully justify the Invention Patent application.

The invention claimed is:

1. Dynamometric bench for headstocks with SOHC and DOHC type overhead camshaft for internal combustion engines characterized by being composed of a testing workbench connected to a monitoring and control panel by means of a conductors, such that the testing workbench, at the same time, is composed of a structure highly equipped with a mobile platform whose horizontal movement is operated by means of a lever and whose periphery is protected by a transparent acrylic cover, above the mobile platform, the headstock is installed, with an overhead camshaft gear directed towards the front of the equipment, thus allowing a grooved belt, to pass through the testing workbench and is coupled to a synchronizer, and an intermediary axle at the same time is coupled to an electrical motor by means of other belts, such that in the interior and opposite part of the testing workbench an oil reservoir is available, coupled to a calibrated oil pump, which pressurizes the oil inside the headstock, when the system is turned on; in the other end of the external framework of the electrical motor a charging cell is coupled, which at the same time is connected to an energized conductor, which sends measurement signals to the monitoring and control panel, composed of a digital rotation counter and a digital rotation controls, which show the digital acceleration, a digital display, which show the anti-torque force reading and the hauling force reading and a digital manometer that registers the oil pressure.

2. Dynamometric bench for headstocks with SOHC and DOHC type overhead camshaft for internal combustion engines, in accordance with claim 1, characterized by the operation process given in eight tests, when a headstock, that contains an overhead camshaft of the "SOHC" (single overhead camshaft) type or of the "DOHC" (dual overhead camshaft) type is subjected to the dynamometric bench:—1st Test: Overhead camshaft and grooved belt: the hauling traction of the overhead camshaft of the system "SOHC" or "DOHC" type is tested, as well as the traction force of the grooved belt except the friction that results in the specification of an appropriate table for variable rotations, with digital acceleration control and digital rotation counter, which the electrical motor of the dynamometric bench varies between 0 and 3500 rpm, determining the hauling reading on the digital display in Kgf; depending on the desired programming in the converter, synchronism occurs between the belts and causing an anti-torque, which is measured by a load cell through the energized conductor, which carries the friction and anti-torque force values, converting them in Kgf in the digital display;—2nd Test: Hydraulic tappets: the operation and loading of hydraulic tappets is tested, through the pressurization of oil stored in the reservoir through the calibrated oil pump, rotated together by the second end of the electrical motor axle; the oil pump pressure, which is indicated in the digital manometer, is proportional to the rotation of the electrical motor, which, through the digital acceleration control, determines the rotation between 0 and 3500 rpm, through the cams of the overhead camshaft; the cam operates the hydraulic tappet, loading it with oil lubricant stored in the reservoir in order to test the correct operation of this overhead camshaft/tappets, which is geared through the grooved belt; after the hydraulic loading of the tappets, they stop thudding and, in one case or another, it continues to thud and is not loaded, the substitution is provided or the reconditioning of these is redone, after a previous and easy visualization;—3rd Test: Warping, lack of clearance or misalignment of the headstock and overhead camshaft: to test such factor through the increase of friction or haul of the grooved belt traction, indicated in the digital counter; in order to do this test, an appropriate and empirical table was created, to attribute minimum permissible values for the frictional and anti-torque force reading presented on the digital display; said table specifies for each type and model Otto and Diesel cycle headstock, according to the engine brand and type, national or imported, fastening the headstock to the testing bench; in case a determined reading does not match, it is necessary to remove the overhead camshaft and analyze its alignment; in case the overhead camshaft has been proven aligned, the alignment of the bearings is examined;—4th Test: Excessive lubricant escape due to waste or excess of clearance of the bearings or overhead camshaft support brackets: an appropriate table is used for each headstock type and model, always in relation to the rotation of the overhead camshaft;—5th Test: clearance of the valves: after completing all the trials of the assembly in the cited phases, the headstock will be ready for regulation or simple checking of the clearances of the valves, in accordance with the manufacturer's manual or inserted clearances in the appropriate table;—6th Test: Gasket rings for valve stems: the operator can easily see the stickiness through the inlet or exhaust duct cavities, such that this procedure can be done with the naked eye, or through the use of a magnifying lens or boroscope; for this case, a lamp with optic fiber conducted lighting accompanies the machine;—7th Test: Gasket or settlement of valves: after doing the pre-softening at high-speed rotation, the rotation is reduced to 50 rpm and in the testing bench itself; it is applied to a tool known as vacuometer; in opening and closing the valve at low-speed rotation (50 rpm), the vacuometer indicates the perfect settlement of the seat and valve gasket;—8th test: other tests: the closed assembly of engines can also be tested when overhauled; the wheel or crankshaft pulley of the engine, which is found fixed in a mobile device, is coupled through a cardan-shaft to the synchronizer axle; these engines can be of any type of overhead camshaft "OHV-SOHC-DOHC" and of the Otto cycle and Diesel cycle engines, measuring the haul friction of the engines through the digital display, simulating the operation of the engine without load, that is, in free gear from 0 to 3500 rpm, and being able to apply a portable manometer in the oil pressure line and checking the adequate pressure, compression pressure of the cylinders, possible escape due to captive valve or due to lack of gasket in the sequence rings, cylinder ovalization and conicity, and visualization of possible oil lubricant leaks.

* * * * *

UNITED STATES PATENT AND TRADEMARK OFFICE
CERTIFICATE OF CORRECTION

| | | |
|---|---|---|
| PATENT NO. | : 7,152,465 B2 | Page 1 of 1 |
| APPLICATION NO. | : 11/182660 | |
| DATED | : December 26, 2006 | |
| INVENTOR(S) | : Candeo | |

It is certified that error appears in the above-identified patent and that said Letters Patent is hereby corrected as shown below:

Column 6, Line 66, Claim 1, "of a conductors" should read -- of a conductor --

Column 7, Line 17, Claim 1, "a digital rotation controls" should read -- a digital rotation control --

Signed and Sealed this

Eighth Day of May, 2007

JON W. DUDAS
*Director of the United States Patent and Trademark Office*